US008972051B2

(12) United States Patent
Rahilly et al.

(10) Patent No.: US 8,972,051 B2
(45) Date of Patent: Mar. 3, 2015

(54) MULTI-COMPARTMENT STEP-DRAWER

(75) Inventors: Michael Rahilly, Encinitas, CA (US); Hao Ton-That, San Diego, CA (US)

(73) Assignee: CareFusion 303, Inc., San Diego, CA (US)

( * ) Notice: Subject to any disclaimer, the term of this patent is extended or adjusted under 35 U.S.C. 154(b) by 37 days.

(21) Appl. No.: 13/482,939

(22) Filed: May 29, 2012

(65) Prior Publication Data

US 2013/0325175 A1 Dec. 5, 2013

(51) Int. Cl.
*G06F 17/00* (2006.01)
*B65D 83/00* (2006.01)

(52) U.S. Cl.
USPC ........... 700/243; 700/242; 700/237; 700/241; 221/154

(58) Field of Classification Search
CPC ........................................................ B65D 83/00
USPC ................... 700/241–242, 237, 243; 221/154
See application file for complete search history.

(56) References Cited

U.S. PATENT DOCUMENTS

| | | | | |
|---|---|---|---|---|
| 5,392,951 | A * | 2/1995 | Gardner et al. | 312/319.5 |
| 5,716,114 | A * | 2/1998 | Holmes et al. | 312/215 |
| 5,927,540 | A * | 7/1999 | Godlewski | 221/2 |
| 6,065,819 | A | 5/2000 | Holmes et al. | |
| 6,109,774 | A * | 8/2000 | Holmes et al. | 700/231 |
| 6,640,159 | B2 * | 10/2003 | Holmes et al. | 700/244 |
| 6,775,591 | B1 * | 8/2004 | Shoenfeld | 700/243 |
| 6,785,589 | B2 * | 8/2004 | Eggenberger et al. | 700/231 |
| 6,996,455 | B2 * | 2/2006 | Eggenberger et al. | 700/231 |
| 7,048,345 | B2 * | 5/2006 | Chaloner et al. | 312/9.43 |
| 7,104,618 | B2 * | 9/2006 | Chaloner et al. | 312/9.43 |
| 7,909,418 | B2 * | 3/2011 | McFarland | 312/215 |
| 8,090,473 | B2 * | 1/2012 | Higham | 700/242 |
| 8,197,017 | B2 * | 6/2012 | Rahilly | 312/222 |
| 8,234,008 | B2 * | 7/2012 | Weber | 700/242 |
| 8,332,066 | B2 * | 12/2012 | Weber | 700/242 |
| 8,335,588 | B2 * | 12/2012 | Rahilly et al. | 700/242 |
| 8,457,784 | B2 * | 6/2013 | Rahilly et al. | 700/242 |
| 8,517,215 | B2 * | 8/2013 | Shafir | 221/152 |
| 8,556,355 | B2 * | 10/2013 | Greenberg | 312/201 |
| 8,662,606 | B2 * | 3/2014 | Santmyer et al. | 312/319.7 |
| 2012/0248134 | A1 * | 10/2012 | Santmyer et al. | 221/1 |
| 2012/0330462 | A1 * | 12/2012 | Maroney et al. | 700/237 |
| 2014/0204537 | A1 * | 7/2014 | Rust | 361/727 |

* cited by examiner

*Primary Examiner* — Michael K Collins
(74) *Attorney, Agent, or Firm* — McDermott Will & Emery LLP

(57) ABSTRACT

A multi-pocket step-drawer is disclosed that includes a dispensing drawer and a control module. The dispensing drawer has a body comprising at least one fixed wall forming at least two open-top compartments that are arranged along an axis parallel to the front-to-back axis and a ladder fixedly coupled to the body. The ladder has a plurality of cross arms arranged along an axis parallel to the front-to-back axis. The control module includes a housing and a latching element coupled to the housing and disposed proximate to the ladder. The latching element has a first position wherein the latching element engages one of the plurality of cross-arms so as to prevent the dispensing drawer from moving toward the front and a second position wherein the latching element allows the dispensing element to move toward the front.

12 Claims, 5 Drawing Sheets

MULTI-COMPARTMENT STEP-DRAWER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field

The present invention generally relates to sliding drawers and, in particular, drawers having electrically controlled mechanisms that require an electrical connection to the sliding drawer.

2. Description of the Related Art

Medications that are expensive or are controlled substances are carefully controlled in hospitals and other healthcare facilities. Many facilities use Automated Dispensing Machines (ADMs) to provide controlled access to such medications without the need for a pharmacist to personally fill every order. Certain ADMs are configured to provide access to only a single dose of a medication at a time. One way of accomplishing this is to provide a drawer having multiple fixed compartments where the distance that the drawer can be opened, and therefore the compartments that are exposed, is controlled by a processor.

In one method of use, a single dose of a medication is placed in one or more compartments of a drawer and the processor programmed with information including the type of medication placed in each compartment. When a caregiver requests a dose of this medication, the processor unlocks the drawer and allows the drawer to open until the first compartment of the drawer is exposed, whereupon the caregiver removes the medication from the first compartment and closes the drawer. When another caregiver requests a dose of the same medication, the processor unlocks the drawer and allows the drawer to open until the second compartment is exposed, as the processor previously recorded that the first compartment is now empty. The caregiver removes the dose from the second compartment and closes the drawer. This process is repeated with the processor allowing sequential access to the compartments of the drawer until all of the medications are removed.

Currently available drawers of this type control the distance that the sliding drawer is allowed to open using a solenoid-driven latch that is mounted within the sliding drawer to engage a ladder that is fixed to a drawer chassis that is mounted in the ADM. Such a system is disclosed in U.S. Pat. No. 5,716,114 to Holmes and Williamson and U.S. Pat. No. 6,109,774 to Holmes and Broadfield. The drawer-mounted solenoid is connected to the processor through a flexible electrical cable, such as a flat ribbon cable formed from multiple conductors laminated between layers of polyimide, between the sliding drawer and the fixed chassis, wherein the cable flexes each time the drawer is opened. These conventional drawers suffer from breakage of the ribbon cables over time as the constant flexing of the ribbon cables in the confined space induces sufficient stress between the polyimide layers that the ribbon cables eventually delaminate.

SUMMARY

It is desirable to provide a drawer with increased reliability that allows access only to designated compartments by controlling the distance that the drawer can be opened. The disclosed system and method provide this feature. In certain aspects of the disclosed system, the sliding portion of the drawer assembly has no electrical components, thereby eliminating the need for the flexible electrical cable that is a point of failure in current drawers. This lack of electrical interconnection also improves the capability to fill a sliding drawer in the pharmacy and transport the filled drawer to the ADM and install the drawer into an open position in the chassis.

In certain embodiments, a step drawer is disclosed that includes a dispensing drawer having a front and a front-to-back axis. The dispensing drawer includes a body having at least one fixed wall forming at least two open top compartments that are arranged along an axis parallel to the front-to-back axis. The dispensing drawer also includes a ladder that is fixedly coupled to the body. The ladder has a plurality of cross arms arranged along an axis parallel to the front-to-back axis. The step-drawer also includes a control module having a housing and a latching element coupled to the housing and disposed proximate to the ladder. The latching element has a first position wherein the latching element engages one of the plurality of cross-arms so as to prevent the dispensing drawer from moving toward the front and a second position wherein the latching element allows the dispensing drawer to move toward the front.

In certain embodiments, a step-drawer assembly is disclosed that has plurality of step-drawers. Each step-drawer includes a dispensing drawer having a front and a front-to-back axis. The dispensing drawer has a body comprising at least one fixed wall forming at least two open top compartments that are arranged along an axis parallel to the front-to-back axis and a ladder fixedly coupled to the body. The ladder has a plurality of cross arms arranged along an axis parallel to the front-to-back axis. Each step-drawer also includes a control module having a housing and a latching element that is coupled to the housing and disposed proximate to the ladder. The latching element has a first position wherein the latching element engages one of the plurality of cross-arms so as to prevent the dispensing drawer from moving toward the front and a second position wherein the latching element allows the dispensing element to move toward the front. The step-drawer assembly also includes a chassis configured to accept the plurality of step-drawers.

In certain embodiments, an ADM is disclosed that includes at least one step-drawer assembly having a plurality of step-drawers each comprising a dispensing drawer having a front and a front-to-back axis. The dispensing drawer has a body comprising at least one fixed wall forming at least two open top compartments that are arranged along an axis parallel to the front-to-back axis and a ladder fixedly coupled to the body. The ladder has a plurality of cross arms arranged along an axis parallel to the front-to-back axis. Each step-drawer also has a control module comprising a housing and a latching element that is coupled to the housing and disposed proximate to the ladder. The latching element has a first position wherein the latching element engages one of the plurality of cross-arms so as to prevent the dispensing drawer from moving toward the front and a second position wherein the latching element allows the dispensing element to move toward the front. The step-drawer assembly also includes a chassis configured to accept a plurality of drawers.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The following description discloses embodiments of a step-drawer and step-drawer assembly as well as machines that incorporate step-drawers. In certain embodiments, this type of step-drawer is particularly suited for single-dose dispensing of medications and medical supplies in a healthcare environment. The various aspects of step-drawers disclosed herein, however, may be utilized in other industries and for other purposes than presented herein, for example for storage and dispensing of cutting tools and bits in a machine shop.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1:
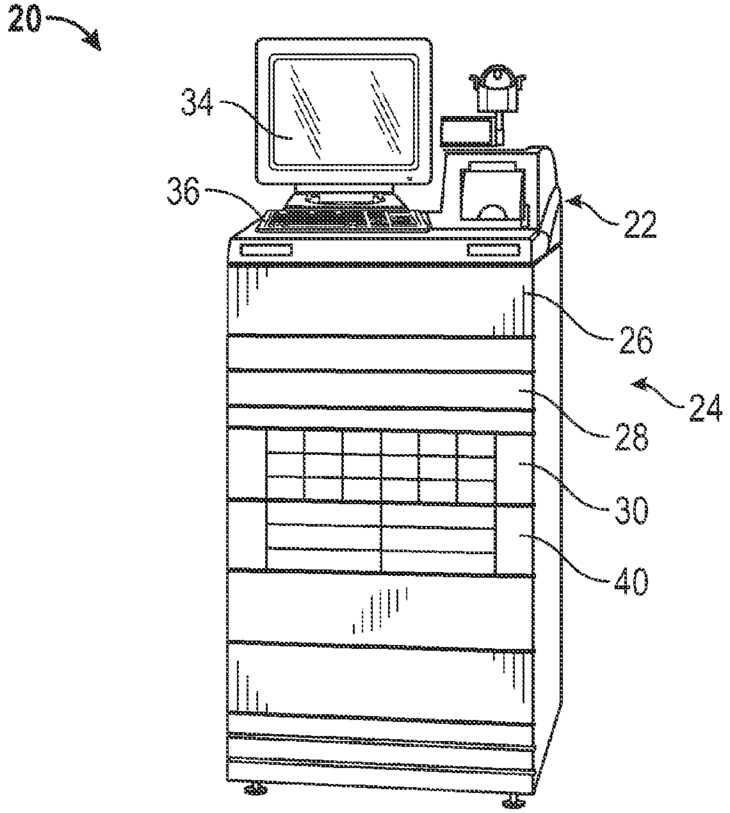
FIG. 1 depicts an ADM equipped with step-drawers according to certain aspects of the present disclosure.

FIG. 1 depicts an ADM 20 equipped with step-drawers according to certain aspects of the present disclosure. The ADM 20 has a cabinet 24 in which are installed several types of drawers, including a full-height open-compartment drawer 26, two half-height open-compartment drawers 28, an 18-drawer step-drawer assembly 30, and a 6-drawer step-drawer assembly 40. The ADM 20 also has a top 22 that includes a display 34 and keyboard 36 that form a user interface. The top 22 also includes a processor (not visible in FIG. 1) that accepts input from the user interface, communicates with other devices, such as servers, over a hospital network, and controls the operation of the various drawers 26, 28, 30, and 40 of the ADM 20. ADMs are available in a variety of configurations, for example towers for storage of larger items and mobile cabinets for easy movement of medications and supplies to the point of use.

Figure 2:
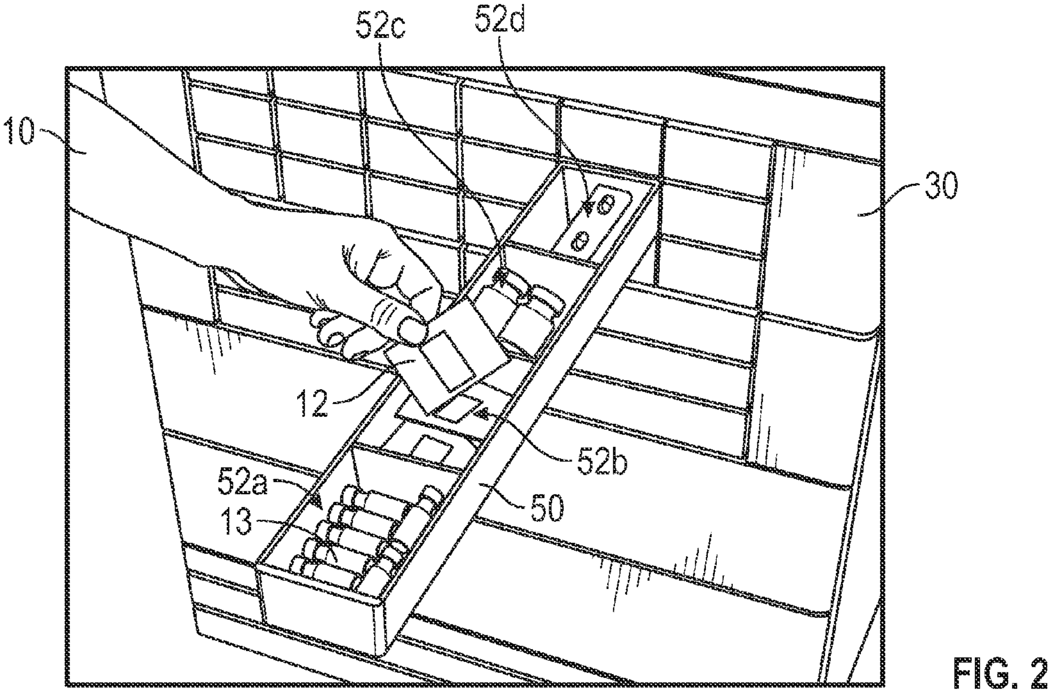
FIG. 2 depicts an extended step-drawer according to certain aspects of the present disclosure.

FIG. 2 depicts an extended step-drawer 50 according to certain aspects of the present disclosure. In this example, the step-drawer 50 is part of the step-drawer assembly 30 in the ADM 10 of FIG. 1. This step-drawer 50 is configured to store different types of items in the various compartments 52A, 52B, 52C, and 52D. For example, compartment 52A contains ampoules 13 while compartment 52B contains pills 12 in single-dose envelopes. This may be appropriate for a particular procedure that requires multiple items for a single treatment. The user 10, in this example, has access to all four compartments 52A-52D. In other configurations, the step-drawer 50 may be configured to allow access to only one compartment.

Figure 3:
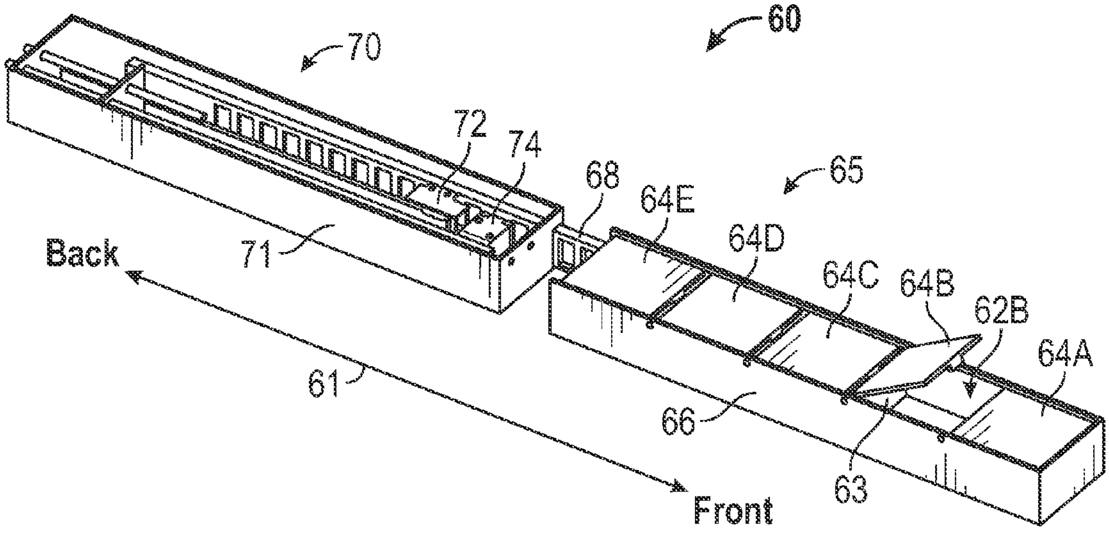
FIG. 3 is a perspective view of an exemplary embodiment of a step-drawer according to certain aspects of the present disclosure.

FIG. 3 is a perspective view of an exemplary embodiment of a step-drawer 60 according to certain aspects of the present disclosure. The step-drawer 60 comprises a dispensing drawer 65 and a control module 70 that are, in this embodiment, aligned with each other along an axis parallel to the front-to-back axis 61. The dispensing drawer 65 has a body 66 that, in this embodiment, has several fixed walls forming five open-top compartments 62A-62E that are arranged within the body 66 along an axis parallel to the front-to-back axis 61. In certain embodiments, the body 66 and the walls between the compartments 62A-62E is formed as a single-piece molded from, for example, a plastic. The fixed walls 63 that separate the compartments 62A-62E provide increased security of the contents of each compartment 60, compared to the use of adjustable walls or dividers. As an example, if a user has been granted access to compartment 62B, a fixed wall 63 makes it more difficult for a user to deform or displace the wall between compartments 62B and 62C to gain unauthorized access to the contents of compartment 62C. In certain embodiments, the walls are bonded or otherwise permanently attached to the body 66.

The dispensing drawer 65 also has, in this embodiment, lids 64A-64E that respectively cover the open-top compartments 62A-62E. In this embodiment, the lids 64A-64E are hingedly connected to the body 66. In certain embodiments, the lids have a detent feature (not visible in FIG. 3) that cooperates with features on the body 66 to retain the lids 64A-64E in a closed position. In certain embodiments, this detent feature comprises a "push to open" release mechanism and spring-load mechanism (not shown in FIG. 3), wherein the user presses downward on a lid to release the detent, whereupon the lid opens upwards due to the spring-load mechanism, and the lid is closed by pressing the lid downward to the closed position whereupon the detent feature engages and retains the lid in the closed position.

This embodiment of the dispensing drawer 65 includes a ladder 68 that extends from the back end of the body 66 and into the control module housing 71. The ladder 68 is discussed in greater detail with respect to FIG. 5.

Figure 6A:
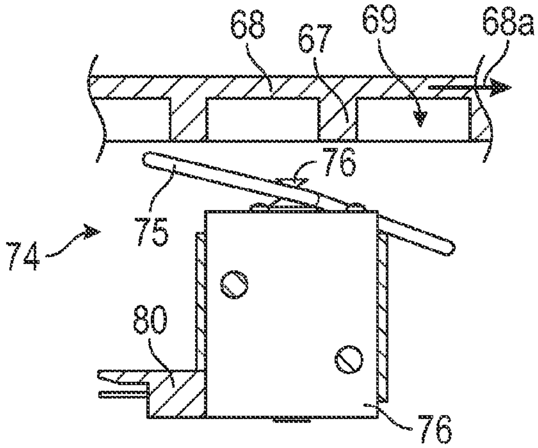
FIGS. 6A-6B are top views of the latching element and ladder of FIG. 5 in unactuated and actuated positions according to certain aspects of the present disclosure.
Figure 6B:
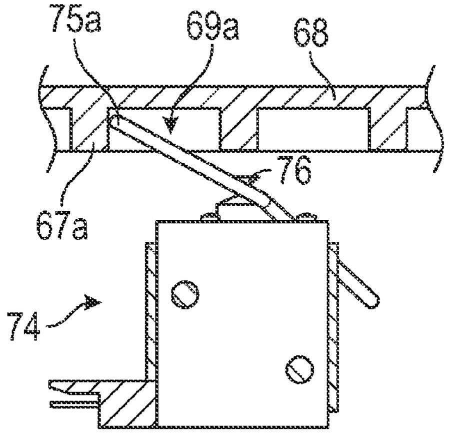

The control module 70 has a housing 70 that contains, in this embodiment, a latching mechanism 74 that is discussed in greater detail with respect to FIGS. 6A and 6B. The housing 71 also contains a sensor 72 that, in certain embodiments, senses the position of the dispensing drawer relative to the control module and provides a signal comprising information related to the sensed position. This sensor may be implemented, for example, as an optical scanner fixed in the housing 71 and an optically encoded reflective strip that is attached to the ladder 68, so as to provide unambiguous position information. In certain embodiments, the sensor 72 senses displacement of the dispensing drawer 65 with respect to the control module and provides this displacement information to a processor (not shown in FIG. 3) that determines a position of the dispensing drawer by integrating the incremental displacement information received from the sensor 72. The step-drawer 60 is configured so as to be integrated into a drawer assembly, such as the drawer 30 of FIG. 2, as is discussed in greater detail with respect to FIG. 8.

Figure 4:
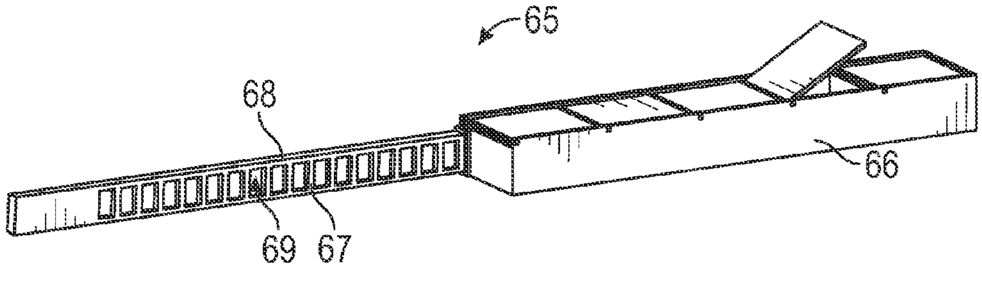
FIG. 4 depicts an exemplary dispensing drawer according to certain aspects of the present disclosure.

FIG. 4 depicts an exemplary dispensing drawer 65 according to certain aspects of the present disclosure. In this view, it can be seen how the ladder 68 extends from the back end of body 66. It can also be seen that the ladder 68 comprises a series of cross-arms 67 arranged along an axis parallel to the front-to-back axis of FIG. 3, with the cross-bars separated by pockets 69.

Figure 5:
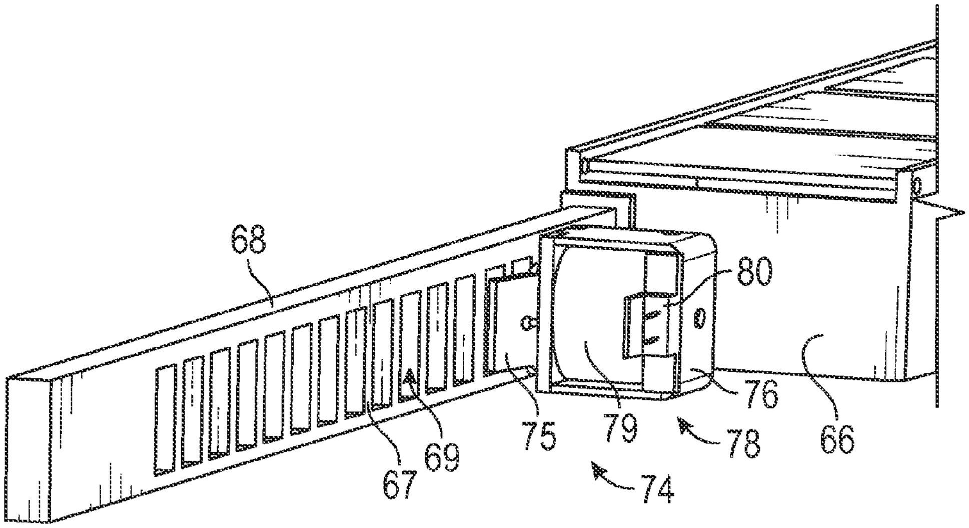
FIG. 5 depicts the latching element positioned proximate to the ladder of the dispensing drawer according to certain aspects of the present disclosure.

FIG. 5 depicts a latch 74 positioned proximate to the ladder 68 of the dispensing drawer according to certain aspects of the present disclosure. The example latch 74 comprises a latching element 75, an electrical connector 80, and an actuator 78 that includes a solenoid coil 79 mounted inside a frame 76 that is coupled to the housing 71 (not shown in FIG. 5 for clarity) of the control module 70.

FIGS. 6A-6B are top views of the latch 74 and the ladder 68 of FIG. 5 in actuated and unactuated positions according to certain aspects of the present disclosure. In FIG. 6A, power is provided through connector 80 thereby energizing the solenoid 79 which retracts the moving core 76 and pulls the latching element 75 away from the ladder 68 such that the ladder 68, and therefore the dispensing drawer 65, may move freely with respect to the housing 71 of the control module 70. In particular, this position of the latching element 75 allows the dispensing drawer 65 to move toward the front as indicated by arrow 68A.

In FIG. 6B, the latch 74 is unactuated, i.e. the moving core 76 of the solenoid 79 is extended, and the latching element 75 is engaged with cross-arm 67A so as to prevent the dispensing drawer 65 from moving toward the front. In this example, the latch 74 is actuated by application of power through connector 80 to initially release the dispensing drawer 65. While the user is pulling the dispensing drawer 65 out, the ladder is moving toward the front, i.e. in the direction of arrow 68A. When power is cut off to the latch 74, i.e. the latch 74 is de-actuated, the tip 75A will enter pocket 69A and act as a stop when the wall 67A comes into contact with the tip 75A. The timing of when the latch 74 is de-actuated is controlled by a processor 80 (shown in FIG. 9). The processor 80 accepts a signal from the sensor 72 that enables the processor to determine, in certain embodiments, the current position and velocity of the dispensing drawer 65. The processor 80 also determines, based on information retrieved from memory 82 (shown in FIG. 9) or other data source, which compartment of the dispensing drawer 65 is to be accessed. As the dispensing drawer 65 is pulled out by the user, the processor monitors the position of the dispensing drawer 65 and de-actuates the latch 74 at the proper time to extend the latching element 75 so as to engage a cross-bar at the appropriate position to stop the dispensing drawer 65 is a position wherein the intended compartment is accessible but the rearwardly adjacent compartment is not accessible. In certain embodiments, the actuator 74 comprises a spring element (not visible in FIGS. 6A and 6B) that forces the moving core 76 of the solenoid 79 toward the position shown in FIG. 6B in the absence of applied power, thereby providing a "fail safe" feature that the step-drawer 60 will remain locked in the event of a loss of power to the ADM 20 in which the step-drawer 60 is mounted.

Figure 7A:
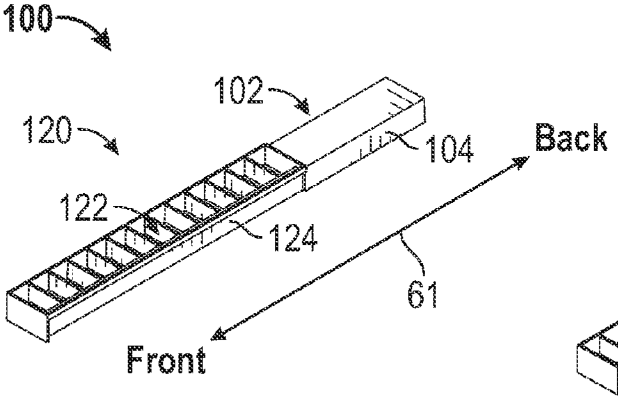
FIGS. 7A-7C are perspective views of another embodiment of a step-drawer according to certain aspects of the present disclosure.
Figure 7B:
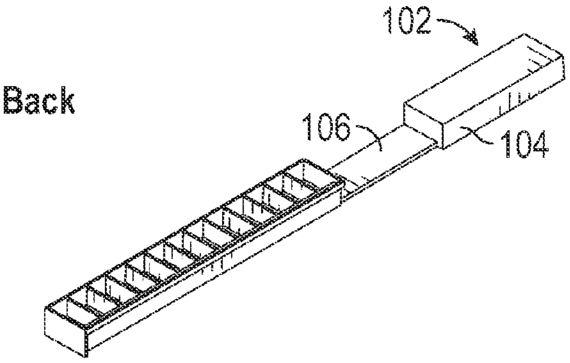
Figure 7C:
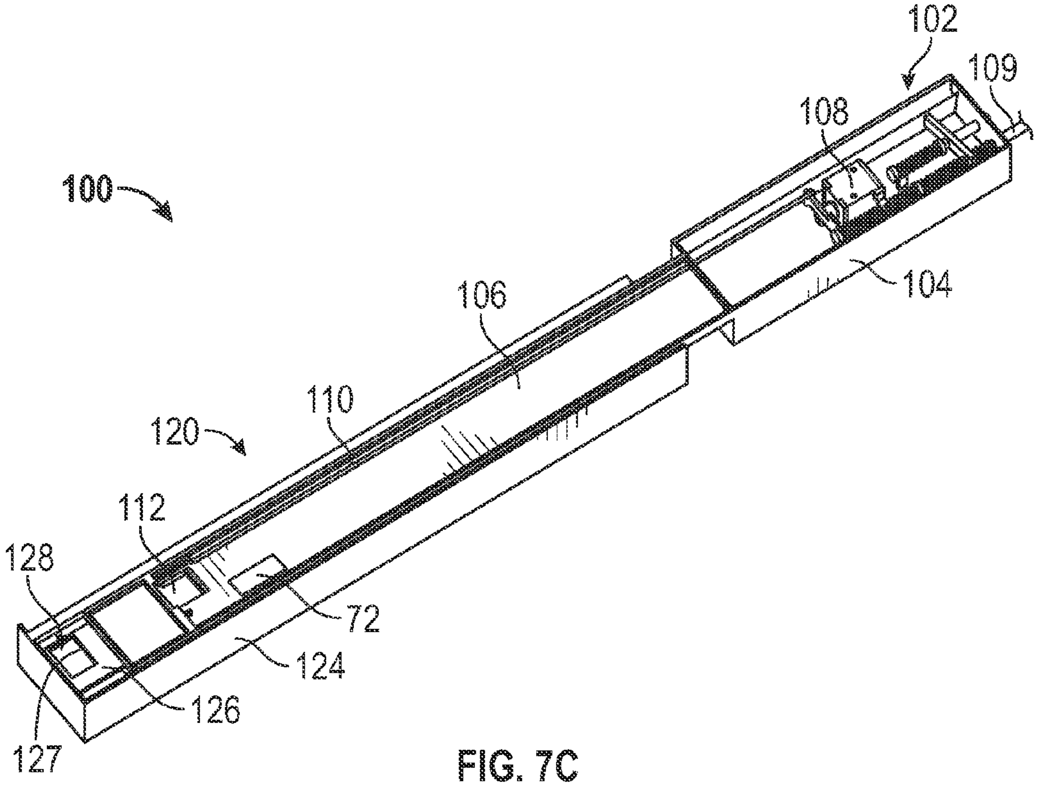

FIGS. 7A-7C are perspective views of another embodiment 100 of a step-drawer according to certain aspects of the present disclosure. FIG. 7A shows a dispensing drawer 120 having a plurality of open-top compartments 122 without lids formed in the body 124 of dispensing drawer 120 and a control module 102 having a housing 104, wherein the dispensing drawer 120 is shown in the "closed" position, i.e. the positions of the step-drawers of drawer 30 shown in FIG. 1. It can be seen that the dispensing drawer 120 and control module 102 are aligned with each other along an axis parallel to the front-to-back axis 61.

FIG. 7B shows the dispensing drawer 120 displaced toward the front, i.e. in the direction that the dispensing drawer 120 would move relative to the control module 104 when a user is accessing one of the compartments 122. It can be seen that, in this embodiment, the control module 102 comprises a tab 106 that is fixedly coupled to the housing 104. The tab 106 extends from the front end of the housing 104 and is disposed adjacent to the underside of body 124 of the dispensing drawer 120. It can be seen that the dispensing drawer 120 and the control module 102 are configured such that the dispensing drawer 120 moves with respect to the control module 102 solely along an axis parallel to the front-to-back axis 61.

FIG. 7C depicts the underside of step-drawer 100. In this view, it can be seen that a ladder 126 is disposed on the bottom of the body 124 of dispensing drawer 120, with openings 128 separating cross-bars 127. The front end of tab 106, in this embodiment, is proximate to the front of the body 124 when the dispensing drawer 120 is in the "closed" position. A latching element 112 is coupled to the tab 106 proximate to the front end of the tab 106. The latching element 112 has a first position wherein the latching element 112 engages one of the plurality of cross-arms 127 so as to prevent the dispensing drawer 120 from moving toward the front and a second position wherein the latching element 112 allows the dispensing drawer 120 to move toward the front. In certain embodiments, a sensor 72 senses the position of the dispensing drawer 120 relative to the control module 102 and provides a signal comprising information related to the sensed position.

In this embodiment, the actuator 108 is disposed within the housing 104 and coupled to the latching element 112 through a rod 110 that passes underneath the tab 106. In this view, a manual release actuator 109 is visible and configured such that pressing the manual actuator 109 moves the latching element 112 to the second position, thereby allowing the dispensing drawer 120 to freely move relative to the control module 102.

Figure 8:
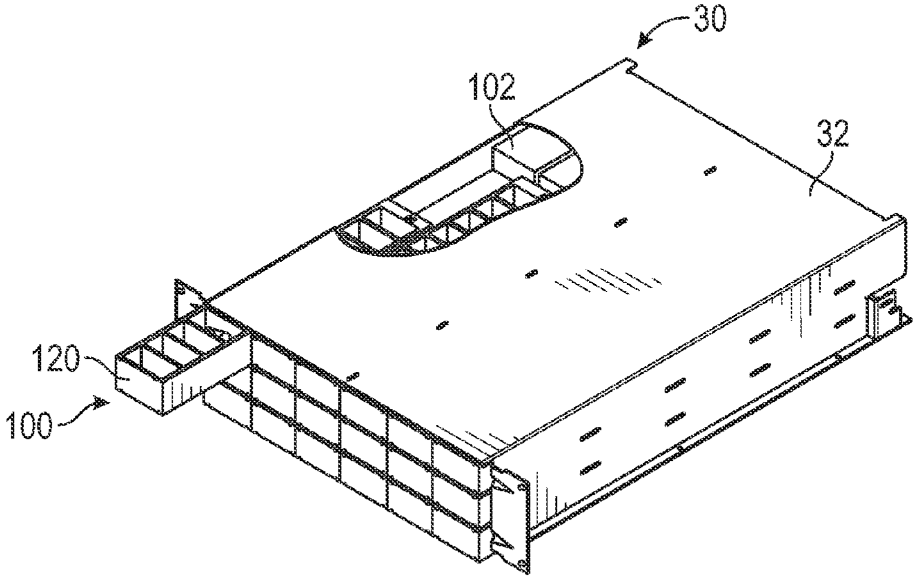
FIG. 8 depicts an exemplary step-drawer assembly according to certain aspects of the present disclosure.

FIG. 8 depicts an exemplary step-drawer assembly 30 according to certain aspects of the present disclosure. The step-drawer assembly 30 comprises a chassis 32 formed, in this embodiment, from sheet metal in the form of an open box. This chassis 32 is configured to accept eighteen step-drawers 100, wherein the control modules 102 are positioned behind the respective dispensing drawers 120 such that any dispensing drawer 120 may be extended from the chassis 32. For an ADM 20, such as shown in FIG. 1, the chassis 32 is mounted within the cabinet 24. In other dispensing systems (not shown), the chassis 32 is mounted to a frame or other structural element.

Figure 9:
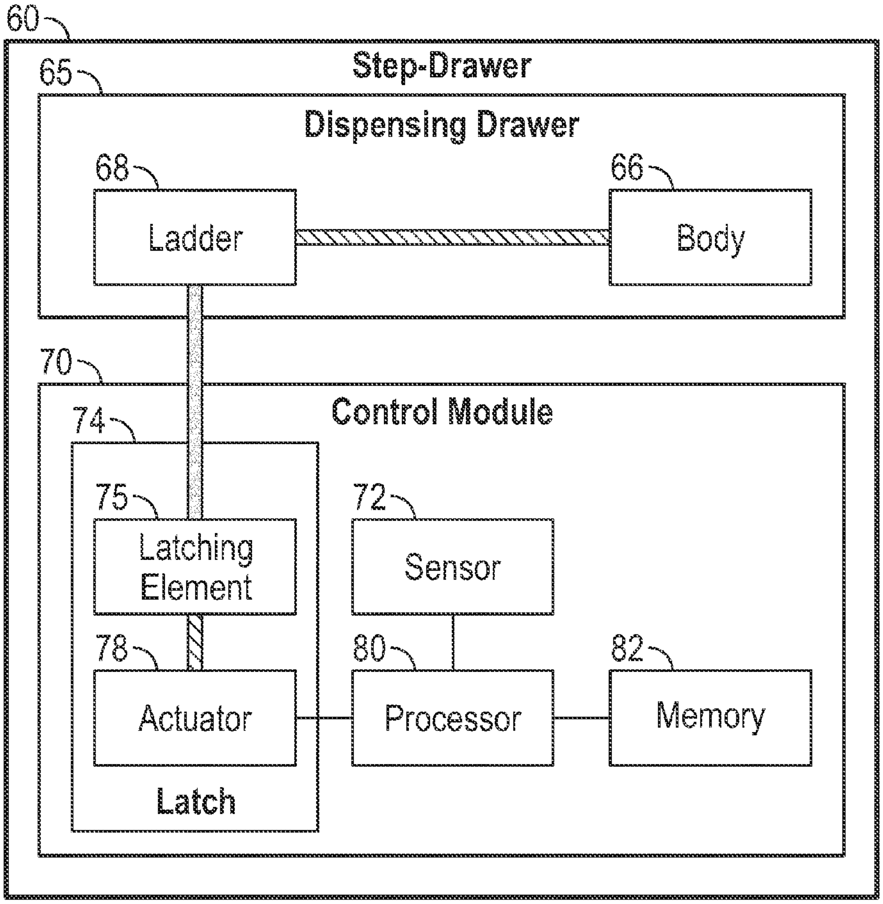
FIG. 9 is a block diagram of a step-drawer according to certain aspects of the present disclosure.

FIG. 9 is a block diagram of a step-drawer 60 according to certain aspects of the present disclosure. The mechanical connection between the ladder 68 and body 66 of the dispensing drawer 65 is shown by a shaded bar. Similarly, the mechanical connection between the actuator 78 and the latching element 75 of the control module 70 is shown by the same type of shaded bar. The selectable mechanical engagement of the latching element 75 with the ladder 68 is shown by a bar of a lighter shade. The electrical coupling of the processor 80 to the sensor 72, actuator 78, and memory 82 are shown by black lines. Other conventional elements of electromechanical systems, such as power supplies, communication and networking interfaces, and interface boards, are omitted from the block diagram for clarity.

The disclosed examples of a step-drawer are suitable for secure storage and controlled dispensing of high-value items such as cutting tools and medications. An ADM equipped with a step-drawer assembly as described herein can provide effective management of controlled substances without requiring the presence of a pharmacist or pharmacy technician. The aspects of the design of the step-drawer provide increased reliability of operation that is important is a hospital where this type of equipment is in continuous use and an operational failure of the hardware degrades the ability of the hospital staff to care for their patients by rendering the medications that are stored in the failed unit unavailable until the unit can be replaced or repaired.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the term "some" refers to one or more.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "operation for."

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. A step-drawer for preventing the deterioration of electrical components comprising:

a dispensing drawer having a front, a back, and a front-to-back axis, and configured such that no electrical interconnection is required between controlling components and the dispensing drawer to automatically control movement of the dispensing drawer, the dispensing drawer comprising:

a body comprising at least one fixed wall forming at least two open-top compartments that are arranged along a first axis parallel to the front-to-back axis, the body configured to move in a sliding motion along the first axis; and a ladder fixedly coupled to the body, the ladder comprising a plurality of cross-arms arranged along a second axis parallel to the front-to-back axis, the ladder configured to move with the body in a sliding motion along the second axis; and a control module comprising:

a housing including an opening for storing the ladder and enabling the sliding motion of the ladder with the body along the second axis; and a latching element coupled to the housing, configured to remain in a static position within the housing during relative sliding movement between the ladder and the housing, and disposed proximate to the ladder, the latching element having (i) a first position wherein the latching element extends into a space between adjacent cross-arms, such that the latching element engages one of the plurality of cross-arms so as to limit dispensing drawer movement toward the front and (ii) a second position wherein the latching element is withdrawn from the space between and is out-of-plane with respect to the adjacent cross-arms, such that the latching element allows the dispensing drawer to move toward the front.

2. The step-drawer of claim 1, wherein the dispensing drawer and control module are configured such that the dispensing drawer moves with respect to the control module solely along an axis parallel to the front-to-back axis.

3. The step-drawer of claim 2, wherein the dispensing drawer and control module are aligned with each other along an axis parallel to the front-to-back axis.

4. The step-drawer of claim 3, wherein a portion of one of the dispensing drawer and control module extends in a direction parallel to the front-to-back axis so as to overlap the other of the dispensing drawer and control module.

5. The step-drawer of claim 4, wherein:

the body of the dispensing drawer comprises a back end;

the ladder extends from the back end of the body and into the control module; and the latching element is disposed with the housing.

6. The step-drawer of claim 4, wherein:

the housing of the control module comprises a front end;

the control module further comprises a tab fixedly coupled to the housing, the tab extending from the front end of the housing and adjacent to the dispensing drawer, the tab comprising a front end; and the latching element is coupled to the tab proximate to the front end of the tab.

7. The step-drawer of claim 6, wherein:

the body of the dispensing drawer comprises a bottom;

the ladder is disposed on the bottom; and the tab extends adjacent to the bottom.

8. The step-drawer of claim 1, further comprising:

a sensor configured to sense an attribute being one of a position and a displacement of the dispensing drawer relative to the control module, the sensor further configured to provide a signal comprising information related to the sensed attribute.

9. The step-drawer of claim 1, further comprising:

an actuator coupled to the latching element and the housing, the actuator configured to selectively move the latching element between the first and second positions.

10. The step-drawer of claim 1, wherein all electrical devices are disposed within the housing of the control module.

11. The step-drawer of claim 1, wherein there are no electrical wire coupled between the dispensing drawer and the control module.

12. The step-drawer of claim 1, further comprising:

a plurality of lids hingedly coupled to the body, the plurality of lids configured to respectively cover at least a portion of the plurality of open-top compartments.

* * * * *